United States Patent
Kawamoto et al.

(10) Patent No.: US 7,462,969 B2
(45) Date of Patent: Dec. 9, 2008

(54) ELECTROMAGNETIC ACTUATOR WITH EXTERNAL COILS

(75) Inventors: Hisashi Kawamoto, Narashino (JP);
Takashi Nakano, Narashino (JP);
Toshiaki Mikuriya, Narashino (JP);
Akinori Kobayashi, Narashino (JP)

(73) Assignee: Seiko Precision Inc., Chiba (JP)

( * ) Notice: Subject to any disclaimer, the term of this patent is extended or adjusted under 35 U.S.C. 154(b) by 0 days.

(21) Appl. No.: 11/351,099

(22) Filed: Feb. 8, 2006

(65) Prior Publication Data

US 2006/0125328 A1 Jun. 15, 2006

Related U.S. Application Data

(63) Continuation of application No. PCT/JP2004/011472, filed on Aug. 10, 2004.

(30) Foreign Application Priority Data

Aug. 11, 2003 (JP) ............... 2003-291651

(51) Int. Cl.
*H02K 37/00* (2006.01)
*H02K 7/06* (2006.01)

(52) U.S. Cl. .......... 310/89; 310/216; 310/49 R; 310/217

(58) Field of Classification Search .......... 310/216, 310/217, 49 R, 43, 40 MM, 89, 90, 91, 254, 310/162, 163, 15, 36
See application file for complete search history.

(56) References Cited

U.S. PATENT DOCUMENTS

| | | | | |
|---|---|---|---|---|
| 2,792,510 A | * | 5/1957 | De Wolf | 310/163 |
| 3,200,275 A | * | 8/1965 | Lindgren | 310/90 |
| 3,873,861 A | * | 3/1975 | Halm | 310/43 |
| 4,144,467 A | * | 3/1979 | Nakajima et al. | 310/49 R |
| 4,361,790 A | * | 11/1982 | Laesser et al. | 318/696 |
| 4,371,821 A | * | 2/1983 | Laesser et al. | 318/696 |
| 4,855,629 A | * | 8/1989 | Sato | 310/49 R |
| 4,883,997 A | * | 11/1989 | De Cesare | 310/179 |

(Continued)

FOREIGN PATENT DOCUMENTS

CH 625646 A5 7/1979

(Continued)

OTHER PUBLICATIONS

International Search Report dated Nov. 9, 2004.

(Continued)

*Primary Examiner*—Karl I Tamai
(74) *Attorney, Agent, or Firm*—Michaud-Duffy Group LLP

(57) ABSTRACT

An electromagnetic actuator with a smaller size and an increased strength is provided. In the electromagnetic actuator, a first arm portion and a second arm portion that connect the magnetic poles of a stator extend to the outside of a rotor housing. A first coil and a second coil are wound around the extending portions. In other words, the first coil and the second coil are exposed to the outside of the rotor housing. Accordingly, compared with a case where the rotor housing also houses the first coil and the second coil, the width of the electromagnetic actuator can be reduced by the thickness of the rotor housing. Thus, the electromagnetic actuator can be made compact.

10 Claims, 10 Drawing Sheets

U.S. PATENT DOCUMENTS

| | | | | |
|---|---|---|---|---|
| 5,365,137 | A | * | 11/1994 | Richardson et al. ......... 310/258 |
| 5,408,151 | A | * | 4/1995 | Perrot et al. .......... 310/40 MM |
| 6,075,304 | A | * | 6/2000 | Nakatsuka ................... 310/216 |
| 2006/0125328 | A1 | * | 6/2006 | Kawamoto et al. ............ 310/22 |

FOREIGN PATENT DOCUMENTS

| | | |
|---|---|---|
| JP | 55-122471 A | 9/1980 |
| JP | 55122471 | 9/1980 |
| JP | 59-110355 A | 6/1986 |
| JP | 1-286749 A | 11/1989 |
| JP | 4-47697 | 11/1992 |
| JP | 8-289529 A | 11/1996 |
| JP | 11-346469 A | 12/1999 |

OTHER PUBLICATIONS

Korean Office Action dated Mar. 26, 2007 for Serial No. 9-5-2007-015504862.

* cited by examiner

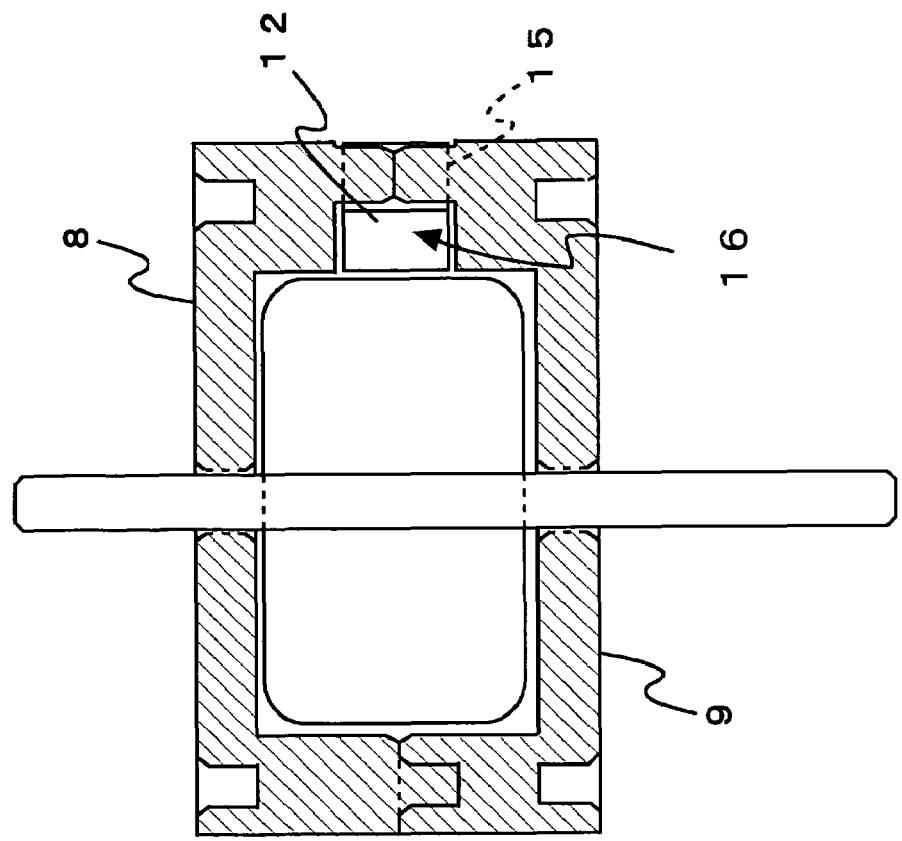
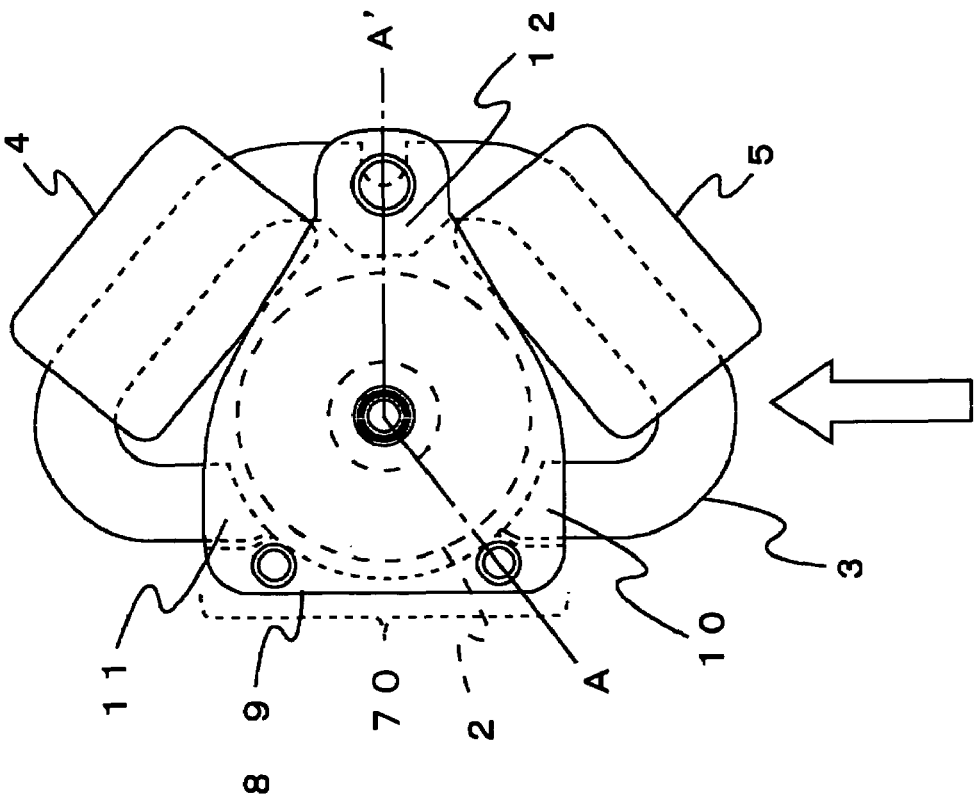

ELECTROMAGNETIC ACTUATOR WITH EXTERNAL COILS

CROSS-REFERENCE TO RELATED APPLICATIONS

This application is a continuation of and claims priority to International Patent Application No. PCT/JP2004/011472 filed on Aug. 10, 2004, which claims priority to Japanese Patent Application Nos. 2003-291651 filed on Aug. 11, 2003, subject matter of these patent documents is incorporated by reference herein in its entirety.

FIELD OF THE INVENTION

The present invention relates to an electromagnetic actuator that includes a rotor and a stator, and more particularly, to a small-sized electromagnetic actuator that is suitable for driving a sector device that is required to be small in size, such as a shutter device or an aperture device for cameras.

BACKGROUND OF THE INVENTION

A conventional electromagnetic actuator includes a rotor, a stator, and coils. In such a conventional electromagnetic actuator, the rotor is magnetized with magnetic poles (the N pole and the S pole), and can reciprocate at predetermined angles (or within an operating range). The stator has magnetic poles arranged to face the outer peripheral face of the rotor. The coils for excitation are wound around the stator.

FIG. 10 illustrates the structure of a conventional electromagnetic actuator that is disclosed in Japanese Utility Model Publication No. 4-47697. In the electromagnetic actuator illustrated in FIG. 10, a rotor housing that is formed with an upper plate 100 and a lower plate 101 both made of plastic is disposed so as to house a rotor 102, a stator 103 positioned to face the outer peripheral face of the rotor 102, and a coil 104 that is wound around the stator 103.

At present, such an electromagnetic actuator is expected to be even smaller, as devices to which the electromagnetic actuator is to be mounted have become smaller. Particularly, with respect to electronic devices that have rapidly become smaller and sophisticated, such as cameras and portable telephone devices with camera functions, the electromagnetic actuators to be used in sector devices such as shutter devices and aperture devices are strongly expected to become smaller.

In the above described electromagnetic actuator disclosed in Japanese Utility Model Publication No. 4-47697, however, the rotor housing needs to be large enough to accommodate the rotor 102, the stator 103, and the coil 104. Therefore, there is a limitation on the reduction in electromagnetic actuator size.

Therefore, the object of the present invention is to provide a smaller electromagnetic actuator.

SUMMARY OF THE INVENTION

The above object of the present invention is achieved by an electromagnetic actuator that includes: a permanent-magnet rotor; a stator that is magnetically bonded to the permanent-magnet rotor; coils that excite the stator; and a rotor housing that rotatably supports and houses the permanent-magnet rotor. In the electromagnetic actuator, the rotor housing supports the stator in such a manner that magnetic poles of the stator face the outer peripheral face of the permanent-magnet rotor. The coils are wound around the portions of the stator extending to the outside of the rotor housing.

In this electromagnetic actuator, the portions other than the magnetic poles of the stator extend to the outside of the rotor housing, and the coils are wound around the extending portions. In other words, the coils are located outside the rotor housing. Accordingly, compared with a conventional electromagnetic actuator with a rotor housing that houses the rotor, the stator, and the coils, the electromagnetic actuator is smaller, because the portions for housing the coils and the arm portions of the stator around which the coils are to be wound can be omitted in the rotor housing.

Also, the stator with the magnetic poles is normally made of a material with a high rigidity such as a metal. As the stator is engaged with the rotor housing, the rigidity of the electromagnetic rotor can be increased.

In the electromagnetic actuator, the stator includes three magnetic poles, and two arm portions that connect the three magnetic poles and extend to the outside of the rotor housing. The coils are wound around the two arm portions. With this structure, the magnetic field generated over the magnetic poles can be controlled by adjusting the current to be applied to the coils wound around the arm portions, and the electromagnetic actuator can be driven with various rotation characteristics.

In this electromagnetic actuator, the stator has a trapezoid shape that has separate portions at the center portion of the lower bottom portion thereof, when seen in a plan view. Two of the magnetic poles are formed at the facing ends of the separate portions at the lower bottom portion, while the other one of the magnetic poles is formed at the center portion of the upper bottom portion of the trapezoid. The coils are wound around the two side portions of the trapezoid. With the three magnetic poles formed in the stator, the magnetic poles are placed on a plane that is perpendicular to the rotational axis of the permanent-magnet rotor, so as to form an isosceles triangle surrounding the permanent-magnet rotor. Thus, an electromagnetic actuator that can perform control operations with high efficiency and high precision can be realized. Here, the stator has a trapezoid shape when seen in a plan view, and one of the magnetic poles is formed at the upper bottom portion while the other two of the magnetic poles are formed at the lower bottom portion at a distance from each other. With this arrangement, the size of the stator can be minimized, and the electromagnetic actuator can be made even smaller.

In this electromagnetic actuator, the rotor housing has an isosceles triangle shape when seen in a plan view, and the lower bottom portion of the trapezoid shape of the stator is located on the same side as the base portion of the isosceles triangle shape of the rotor housing. As described above, with the three magnetic poles being formed in the stator, the magnetic poles should preferably be arranged in an isosceles triangle shape surrounding the permanent-magnet rotor. Therefore, the rotor housing is minimized while containing the magnetic poles arranged in an isosceles triangle shape, or the rotor housing is formed in an isosceles triangle shape. With this structure, the electromagnetic actuator can be made compact. Also, since the lower bottom portion of the trapezoid state is located on the same side as the base portion of the rotor housing having an isosceles triangle shape, a sufficiently large attachment area can be maintained in the rotor housing. Thus, the rotor housing can be secured to the stator.

In this electromagnetic actuator, the rotor housing includes a first casing and a second casing that clamp and support the stator, and positioning portions that are to be engaged with the magnetic poles of the stator so as to secure the magnetic poles to the permanent-magnet rotor are formed in at least one of the first casing and the second casing. The magnetic poles of the stator are positioned to the permanent-magnet rotor when the positioning portions are engaged with the magnetic poles of the stator. The positioning of the magnetic poles of the stator with respect to the permanent-magnet rotor needs to be performed with such a precision as to smoothly rotate the permanent-magnet rotor. With the positioning portions, the positioning of the magnetic poles of the stator with respect to the permanent-magnet rotor can be easily performed.

In the electromagnetic actuator, the rotor housing includes a first casing and a second casing that clamp and support the stator, and at least one of the first casing and the second casing is made of a thermoplastic resin that is to be heated to bond the first casing and the second casing to each other. With this structure, the first and second casings can be easily bonded to each other by applying heat to the contact face between the stacked first and second casings.

In this electromagnetic actuator, the rotor housing has an engaging concave portion or an engaging convex portion formed for positioning the electromagnetic actuator to a member to which the electromagnetic actuator is to be mounted. Here, the engaging concave portion or the engaging convex portion is used for positioning the electromagnetic actuator to the member. While the electromagnetic actuator can be used in a small-sized device such as a small-sized camera, highly precise positioning is required for each component especially in a small-sized camera. With the engaging concave portion or the engaging convex portion, the electromagnetic actuator can be precisely mounted to another device.

In this electromagnetic actuator, the permanent-magnet rotor has a rotational axis protruding from the rotor housing, and a driving member for transmitting the torque of the rotational axis to another component is attached to the protruding portion of the rotational axis. With this structure, a driving member for transmitting the torque of the rotational axis can be attached to the protruding portion of the rotational axis. Using the driving force of the electromagnetic actuator, a shutter device or an aperture device can be adjusted, for example.

In this electromagnetic actuator, the stator is coated with a thermoplastic resin. When heat is applied to the portions coated with the thermoplastic resin, the stator can be easily bonded to the component with which the stator is in contact. Accordingly, the procedure of applying an adhesive agent to each stator with a dispenser becomes unnecessary in the manufacturing process. Thus, the efficiency and yield in the electromagnetic actuator production are increased, and the production cost can be reduced.

In this electromagnetic actuator, at least one of the first casing and the second casing is made of a laser transmission resin. With this structure, laser irradiation that allows local heating can be used for bonding the first and second casings to each other. Thus, stress due to heating can be reduced, and deformation or damage during the manufacturing process can be minimized.

In accordance with the present invention, a smaller electromagnetic actuator can be provided.

BRIEF DESCRIPTION OF THE DRAWINGS

FIG. 3A is a top view of the electromagnetic actuator;

FIG. 3B is a cross-sectional view of the electromagnetic actuator, taken along the line A-A' of FIG. 3A;

DESCRIPTION OF THE PREFERRED EMBODIMENTS

The following is a detailed description of preferred embodiments of the present invention, with reference to the accompanying drawings.

First Embodiment

Figure 1:
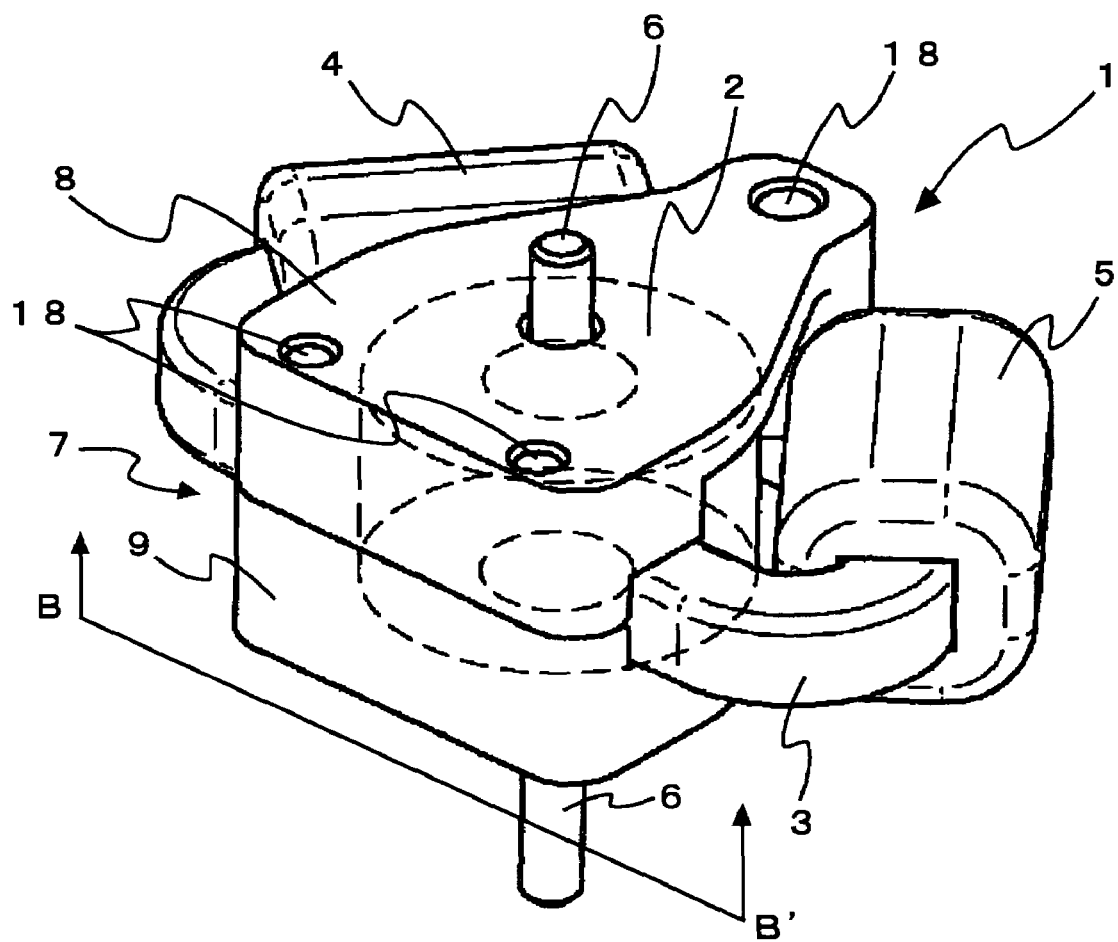
FIG. 1 is an external perspective view illustrating the exterior of an electromagnetic actuator in accordance with a first embodiment of the present invention.

FIG. 1 illustrates the structure of an electromagnetic actuator of this embodiment. The electromagnetic actuator 1 includes a rotor 2, a rotor housing 7 that houses the rotor 2 therein, a stator 3 placed to face the side face of the rotor 2, and a first coil 4 and a second coil 5 wound around the stator 3. As shown in FIG. 1, the stator 3 has arm portions around which the first coil 4 and the second coil 5 are wound extends out of the rotor housing 7. In other words, the first coil 4 and the second coil 5 are disposed outside the rotor housing 7. The first coil 4 and the second coil 5 may be in a bare state, or may be covered with a casing made of resin or the like.

The rotor 2 is formed with a permanent magnet that is magnetized with more than one magnetic pole, and is rotatably supported by the rotor housing 7 that houses the rotor 2 inside.

The rotor housing 7 is formed with an upper casing 8 as a first casing and a lower casing 9 as a second casing. The upper casing 8 is placed on the lower casing 9, and the rotor 2 is housed in the inner space formed by the stacked upper and lower casings 8 and 9. As shown in FIG. 3A, each of the upper casing 8 and the lower casing 9 is an isosceles triangle when seen in a plan view (the regions of the upper and lower casings 8 and 9 corresponding to the bottom regions of the isosceles triangles will be hereinafter referred to a base portion 70). In this description, the shape of the upper surface or the bottom surface of the rotor housing 7 is the shape of the rotor housing 7 when seen in a plan view.

As will be described later, the stator 3 includes three magnetic pole portions (a first magnetic pole portion 10, a second magnetic pole portion 11, and a third magnetic pole portion 12) in this embodiment. So as to efficiently control the rotations of the rotor 2 with the stator 3 with a high precision, the three magnetic pole portions should preferably be disposed so as to form an isosceles triangle surrounding the rotor 2 on a plane that is perpendicular to the rotational axis (a rotor axis 6) of the rotor 2. Therefore, the rotor housing 7 supporting the three magnetic poles needs to have an isosceles triangle formed inside, with the three magnetic poles being the vertexes of the triangle. In the present invention, the rotor housing 7 is required to have such a shape as to house the rotor 2 and support the magnetic poles. Because of this, the shape of the rotor housing 7 seen in a plan view might not be an isosceles triangle. To counter this problem, a shape that is deformed but can barely support the magnetic poles is regarded as an isosceles triangle in the present invention, and the rotor housing 7 should at least have such a deformed isosceles triangle when seen in a plan view. The isosceles triangle mentioned in the previous paragraph might be such a deformed isosceles triangle.

At least either the upper casing 8 or the lower casing 9 (preferably both) is made of a thermoplastic resin. Also, a hole 17 (shown in FIG. 4) penetrates the center portion of the each of the upper casing 8 and the lower casing 9, and the rotor axis 6 is inserted in the hole 17 so that the rotor 2 is rotatably supported. Further, engaging concavities 18 for positioning the electromagnetic actuator 1 to the member to which the electromagnetic actuator 1 is to be attached are formed on the outer faces of the upper casing 8 and the lower casing 9. Although the engaging concavities 18 are formed in the example structure shown in FIG. 1, engaging convexities may be formed instead.

Figure 2A:
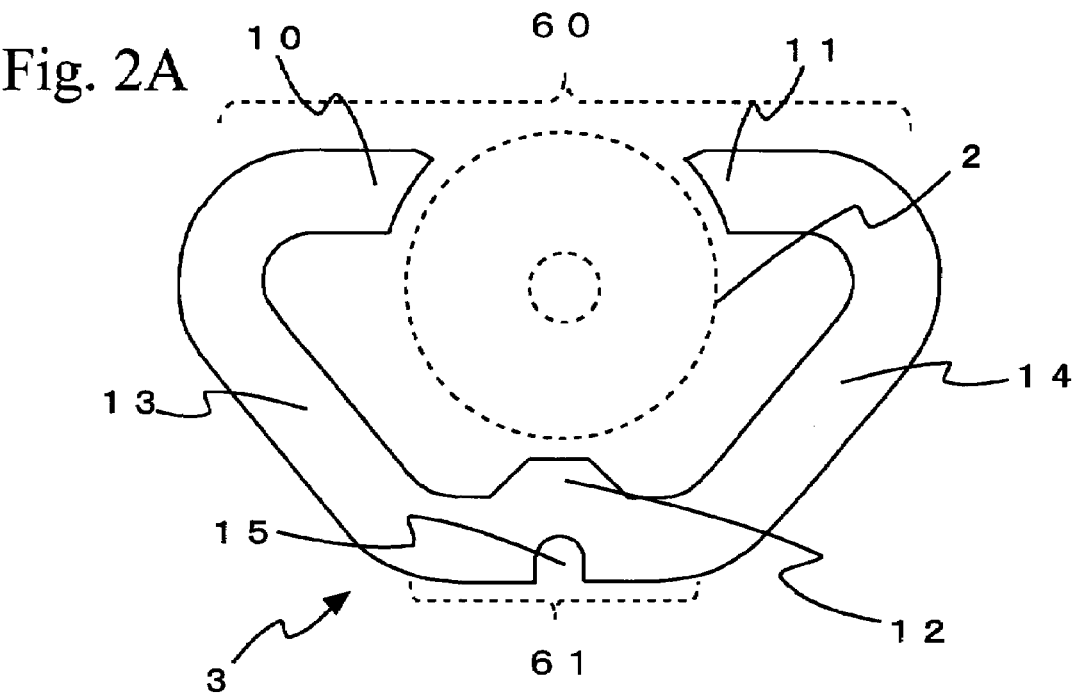
FIGS. 2A and 2B illustrate the external shape of the stator 3.

As shown in FIG. 2A, the stator 3 has the three magnetic poles (the first magnetic pole 10, the second magnetic pole 11, and the third magnetic pole 12) facing the outer peripheral face of the rotor 2. Also as shown in FIG. 2A, the stator 3 has a trapezoid shape when seen in a plan view, and the first magnetic pole 10 and the second magnetic pole 11 that are located at a distance from each other are formed in the center of the lower bottom portion 60 of the trapezoid stator 3. The third magnetic pole 12 is formed in the center of the upper bottom portion 61 of the trapezoid stator 3. In the present invention, the shape of the upper or lower face of the stator 3 is equal to the shape of the stator 3 when seen in a plan view.

As described above, the magnetic poles (the first magnetic pole 10, the second magnetic pole 11, and the third magnetic pole 12) of the stator 3 are preferably arranged in an isosceles triangle. In a case where arm portions 13 and 14 are efficiently attached to the isosceles triangle so as to minimize the size, the arm portions 13 and 14 form a trapezoid shape, with the third magnetic pole 12 being located in the center of the upper bottom portion (corresponding to the vertex between the two sides with the same lengths of the isosceles triangle), and with the first magnetic pole 10 and the second magnetic pole 11 being located at the ends of two separate portions that separate the center of the lower bottom portion (corresponding to the vertexes formed with the base portion 70 and the side portions of the isosceles triangle). In this manner, it is preferable to form the stator 3 in a trapezoid shape when seen in a plan view in this embodiment. To prevent the formation of a magnetic pole at each corner of the stator 3 (or at each vertex of the trapezoid), the stator 3 should preferably have roundish corners. Therefore, in accordance with the present invention, a trapezoid with rounded vertexes may be regarded as the above described trapezoid.

The first arm portion 13 and the second arm portion 14 connect the first through third magnetic poles 10, 11, and 12. More specifically, the first arm portion 13 connects the first magnetic pole 10 and the third magnetic pole 12, while the second magnetic pole 11 connects the second magnetic pole 11 and the third magnetic pole 12.

Figure 2B:
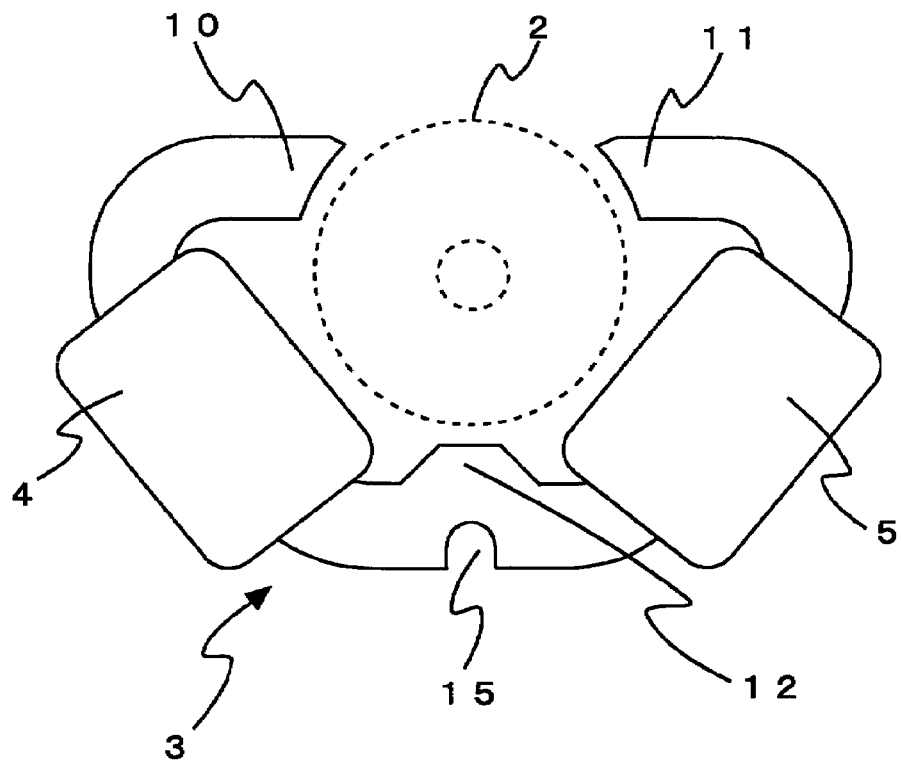

The first arm portion 13 and the second arm portion 14 extend to the outside of the rotor housing 7, as shown in FIG. 1. The first coil 4 and the second coil 5 are wound around the extending portions. As shown in FIG. 2B, the first coil 4 is wound around the first arm portion 13, while the second coil 5 is wound around the second arm portion 14.

As shown in FIG. 2A, a notch 15 is formed on the opposite side of the third magnetic pole 12 from the side facing the rotor 2. The notch 15 is used for positioning the stator 3 to be attached to the upper casing 8 or the lower casing 9.

The driving of the electromagnetic actuator 1 is controlled by a control circuit (not shown). In accordance with a single-phase exciting method, 1-2 phase exciting method, or a two-phase exciting method, the first coil 4 or the second coil 5 is suitably selected by the control circuit, so as to drive the electromagnetic actuator 1 with various rotation characteristics.

As shown in FIG. 3A, the stator 3 is interposed between the stacked upper and lower casings 8 and 9, and the first magnetic pole 10, the second magnetic pole 11, and the third magnetic pole 12 of the stator 3 are clamped at the end faces of the rotor housing 7. FIG. 3B is a cross-sectional view of the electromagnetic actuator 1, taken along the line A-A' of FIG. 3A, and seen from the direction indicated by the arrow in FIG. 3A. As shown in FIG. 3B, notches are formed in the upper casing 8 and the lower casing 9, so that a stator holding space 16 for holding the stator 3 is formed when the upper casing 8 is placed on the lower casing 9.

Figure 4:
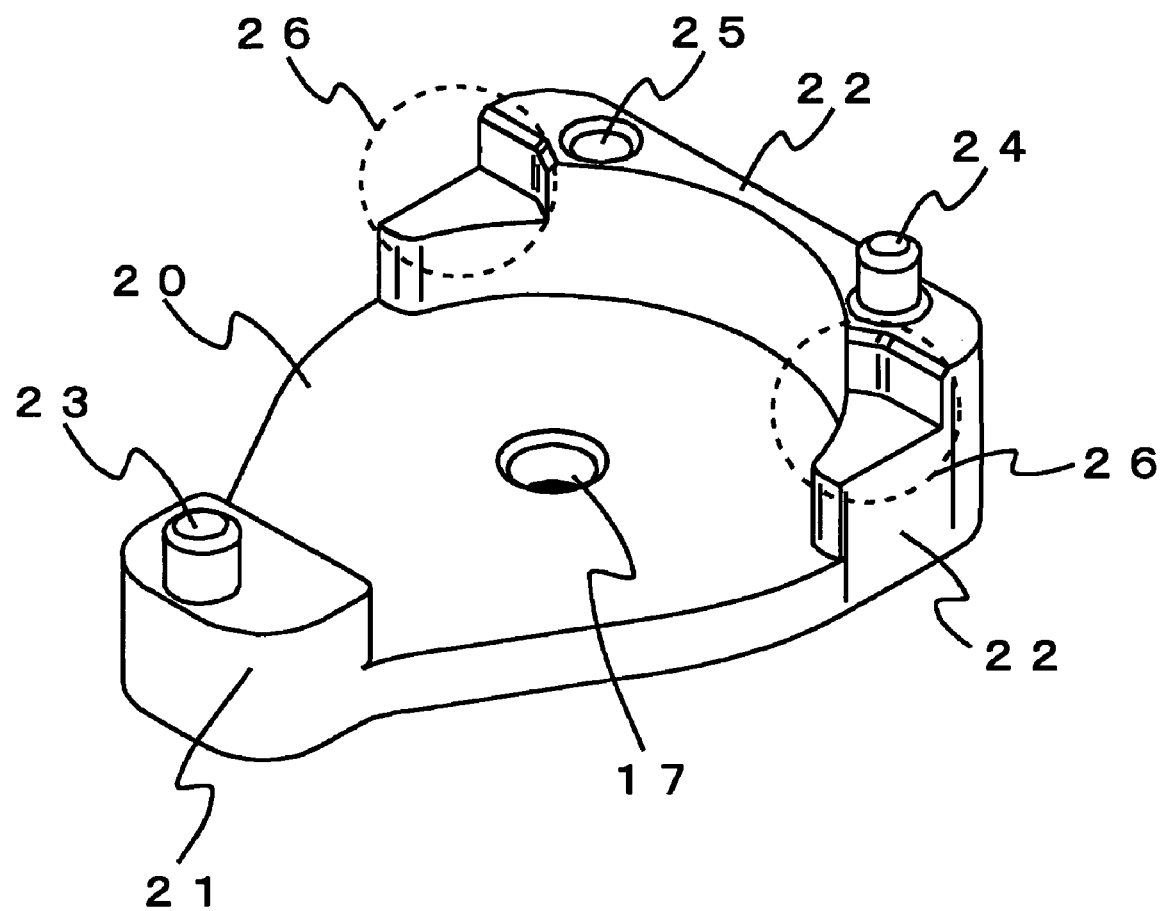
FIG. 4 is an external perspective view illustrating the shapes of the upper and lower casings.

FIG. 4 illustrates the inside of the upper and lower casings 8 and 9. As shown in FIG. 4, each of the upper and lower casings 8 and 9 is formed with a base member 20 that serves as the upper surface or the bottom surface of the rotor housing 7, and a first side face member 21 and a second side face member 22 that are formed on one surface of the base member 20 (an inner face of the rotor housing 7) and serve as the side faces of the rotor housing 7. The base member 20 is designed to be larger than the section of the rotor 2, so as to be able to house the rotor 2. The first side face member 21 and the second side face member 22 to be side faces of the rotor housing 7 are disposed in peripheral areas of the base member 20. The first side members 21 and the second side face members 22 of both the upper casing 8 and the lower casing 9 sandwich the stator 3. Especially, each second side face member 22 has notches for positioning the first and second magnetic poles 10 and 11 of the stator 3 in the vicinity of the rotor 2 housed in the rotor housing 7. When the upper casing 8 is placed on the lower casing 9, the stator holding space 16 for holding the stator 3 shown in FIG. 3B is formed. The stator 3 is placed and held in the stator holding space 16, with the first magnetic pole 10 and the second magnetic pole 11 being buried in the rotor housing 7. The third magnetic pole 12 is held to face the outer peripheral face of the rotor 2 by the first side face members 21 of the stacked upper and lower casings 8 and 9.

Figure 5A:
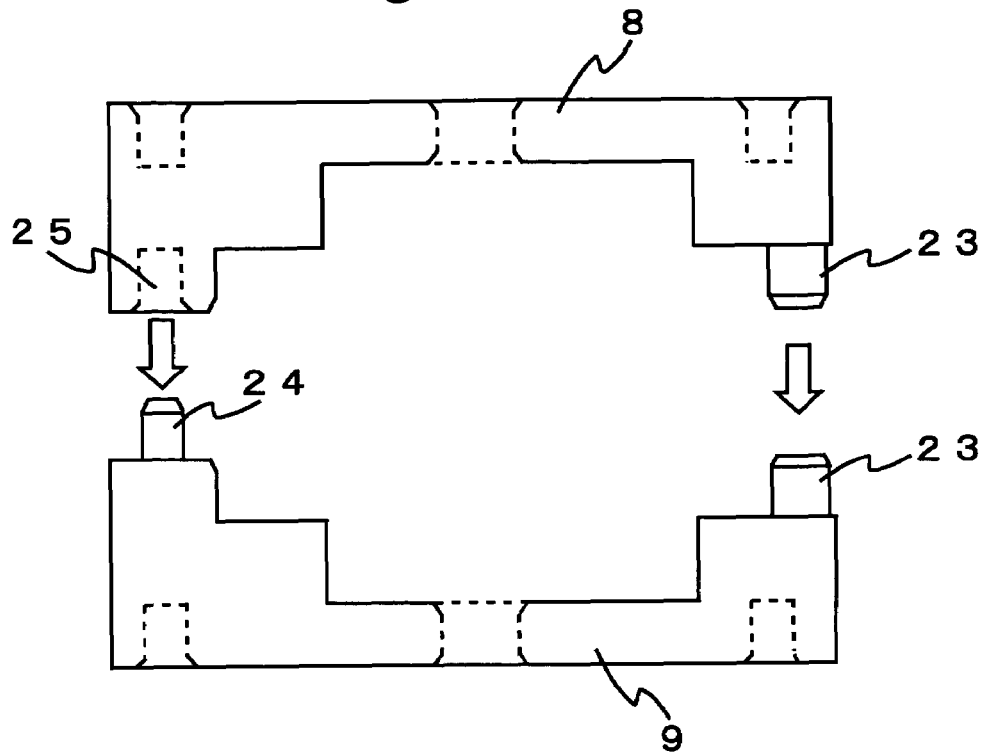
FIGS. 5A and 5B illustrate the procedures for connecting the upper and lower casings.
Figure 5B:
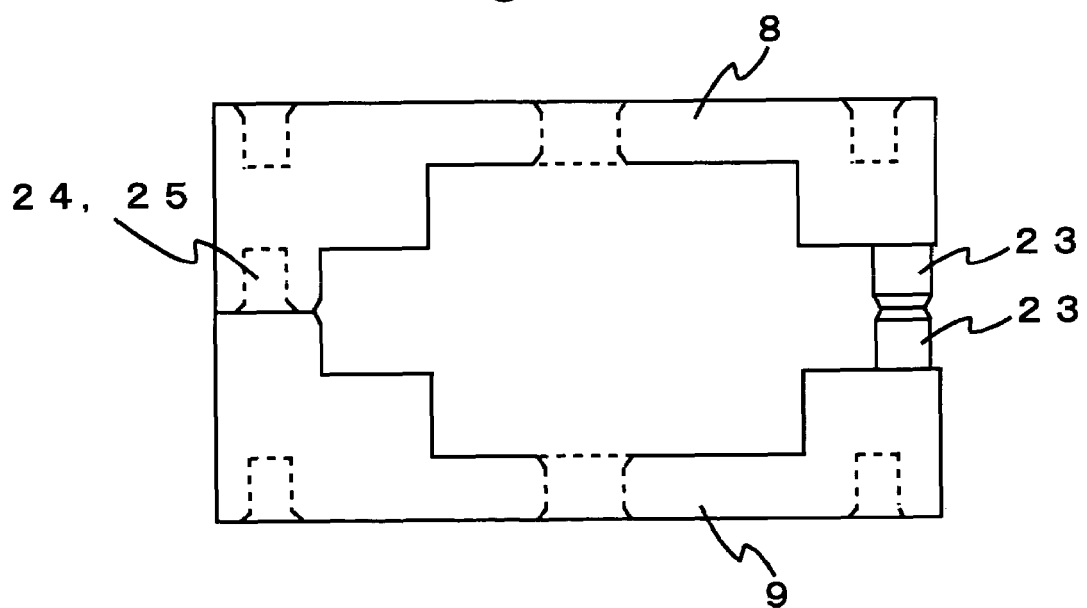

Each of the second side face members 22 has an engaging convex portion 24 and an engaging concave portion 25 for securing the stacked upper and lower casings 8 and 9. Each of the first side face members 21 has a convex portion 23. When the upper casing 8 is placed on the lower casing 9, the engaging convex portion 24 of one casing is engaged with the engaging concave portion 25 of the other casing, as shown in FIGS. 5A and 5B. Thus, the upper and lower casings 8 and 9 are secured to each other. Meanwhile, the convex portions 23 of the first side face members 21 of the upper casing 8 and the lower casing 9 are brought into contact with each other, as shown in FIG. 5B, and are bonded to each other at the contact face.

Figure 6:
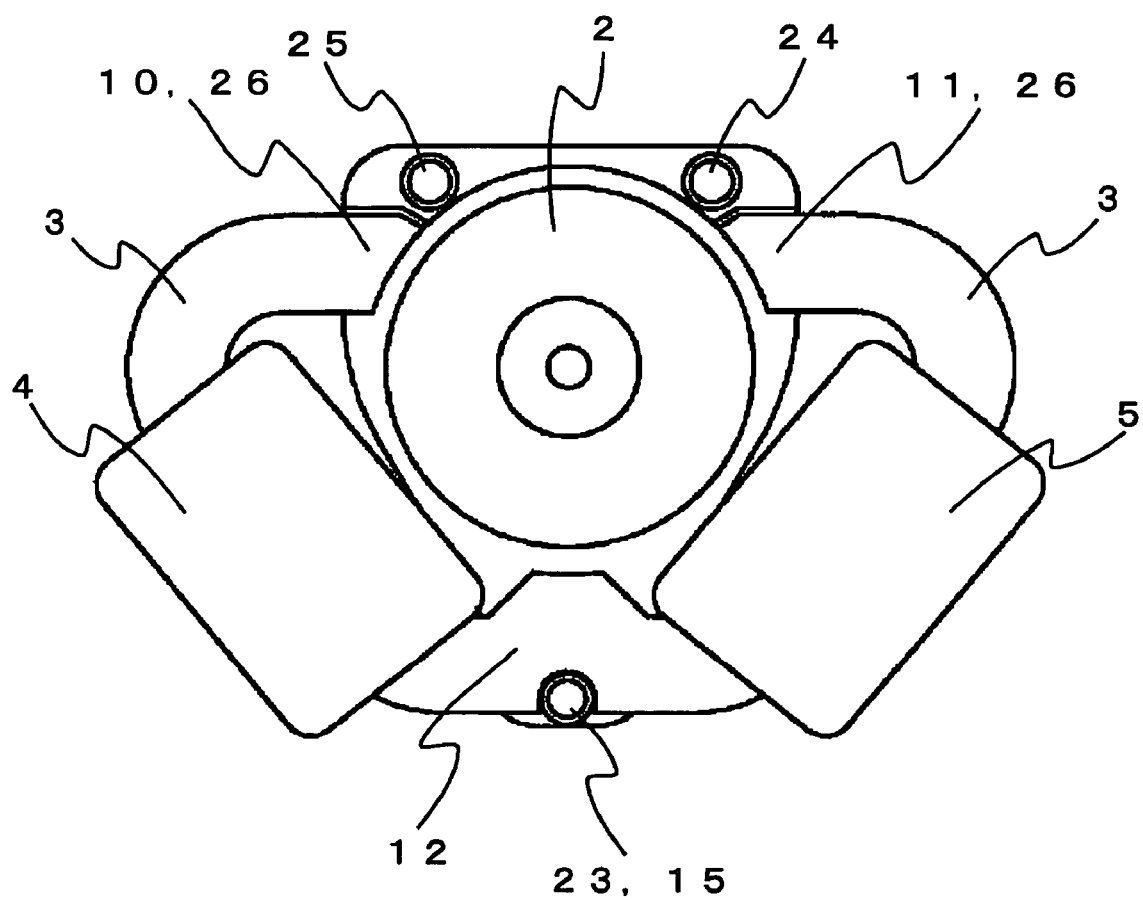
FIG. 6 illustrates a situation in which the rotor and the stator are placed onto the lower casing.

When the stator 3 is placed into either the upper casing 8 or the lower casing 9, the first coil 4 and the second coil 5 wound around the stator 3 are placed in the peripheral regions on the base 20 on which any side face member such as the first side face member 21 or the second side face member 22 is not formed. So as to reduce the size of the electromagnetic actuator 1, the first coil 4 and the second coil 5 located outside the rotor housing 7 should preferably be placed as close as possible to the rotor 2. Therefore, a partition wall for separating the rotor 2 from the first coil 4 and the second coil 5 is not provided in those regions, as shown in FIG. 6.

Next, the method and procedures for assembling the above described structure of this embodiment are described. First, the attachment of the stator 3 to the rotor housing 7 is described.

When the stator 3 is attached to the rotor housing 7, the notch 15 of the stator 3 is engaged with the convex portion 23 of one of the upper and lower casings 8 and 9 (the lower casing 9 in this example), and the first magnetic pole 10 and the second magnetic pole 11 are placed in the notches 26 of the lower casing 9. FIG. 6 illustrates this situation. At this point, positioning is performed so that the first magnetic pole 10, the second magnetic pole 11, and the third magnetic pole 12 are located at the same distance from the rotor 2.

The positioning of the stator 3 (the first magnetic pole 10, the second magnetic pole 11, and the third magnetic pole 12) with respect to the rotor 2 is required to have sufficient accuracy to rotate a magnet rotor smoothly. In this embodiment, the notch 15 formed in the stator 3 is engaged with the convex portion of one of the casings. Thus, the positioning of the magnetic poles of the stator 3 with respect to the rotor 2 can be easily performed.

The rotor 2 is then placed, and the upper casing 8 covers the rotor 2 from the above. Here, the engaging convex portions 24 and the engaging concave portions 25 of the second side face members 22 of the upper and lower casings 8 and 9 are engaged with one another, as shown in FIGS. 5A and 5B. Thus, the upper and lower casings 8 and 9 are positioned to each other. At the same time, the first magnetic pole 10, the second magnetic pole 11, and the third magnetic pole 12 of the stator 3 are held in the rotor housing 7, as shown in FIG. 3B. In this embodiment, the lower bottom portion 60 of the trapezoid stator 3 is located at the base portion 70 of the lower casing 9 that has an isosceles triangle shape when seen in a plan view, as shown in FIG. 6. Also, the upper casing 8 is placed on the lower casing 9 in such a manner that the base portion 70 of the lower casing 9 having the stator 3 mounted thereon and the lower bottom portion 60 of the trapezoid stator 3 are brought into contact with the base portion 70 of the upper casing 8.

Next, the bonding of the upper casing 8 to the lower casing 9 is described. At least one of the upper and lower casings 8 and 9 constituting the rotor housing 7 is made of a thermoplastic resin. Also, at least one of the upper and lower casings 8 and 9 is made of a laser transmission resin (for ease of explanation, the upper casing 8 has laser transmission properties in this embodiment). When the upper casing 8 and the lower casing 9 are bonded to each other, laser beams are emitted onto the contact face between the upper casing 8 and the lower casing 9 from the side of the upper casing 8 made of a laser transmission resin. By doing so, the thermoplastic resin is melted. The melted thermoplastic resin is then cooled down, so that the upper casing 8 and the lower casing 9 are integrally bonded to each other.

When the first coil 4 and the second coil 5 are wound directly around the stator 3, it is necessary to put an insulating material between the stator 3 and the first and second coils 4 and 5. Conventionally, a thermoplastic resin is applied as the insulating material. In this embodiment, however, the same thermoplastic resin as the upper and lower casings 8 and 9 may be employed as the insulating material. The portions of the stator 3 around which coils are to be wound, and the contact areas between the upper and lower casings 8 and 9 are coated with the thermoplastic resin. When the upper and lower casings 8 and 9 are bonded to each other, laser beams are also emitted onto the thermoplastic resin coating the stator 3, so that the stator 3 is bonded to the upper and lower casings 9 and 9. Even if the coating is performed also on the magnetic poles, the magnetic characteristics are not affected, so it is possible to coat the entire surface of the stator 3 with the thermoplastic resin.

Figure 7A:
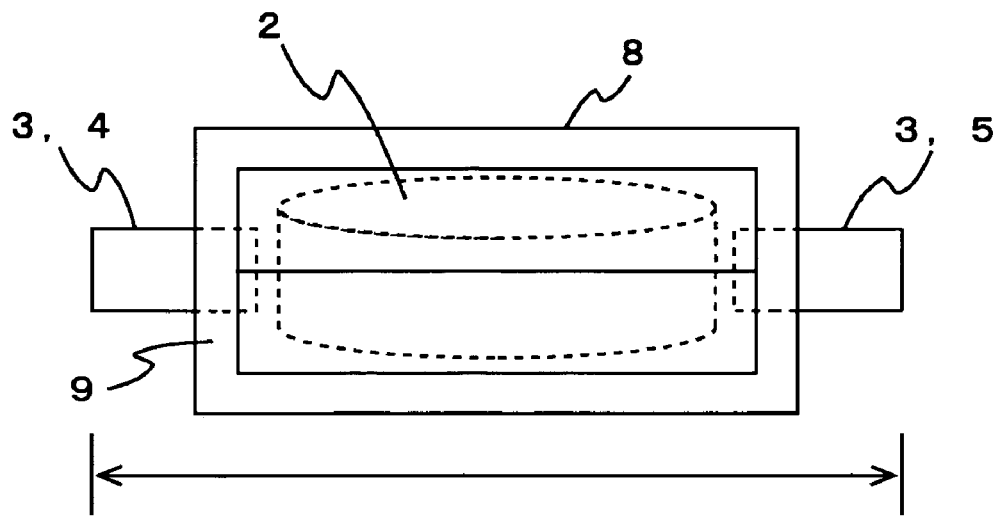
FIG. 7A illustrates the width of the electromagnetic actuator of the first embodiment.
Figure 7B:
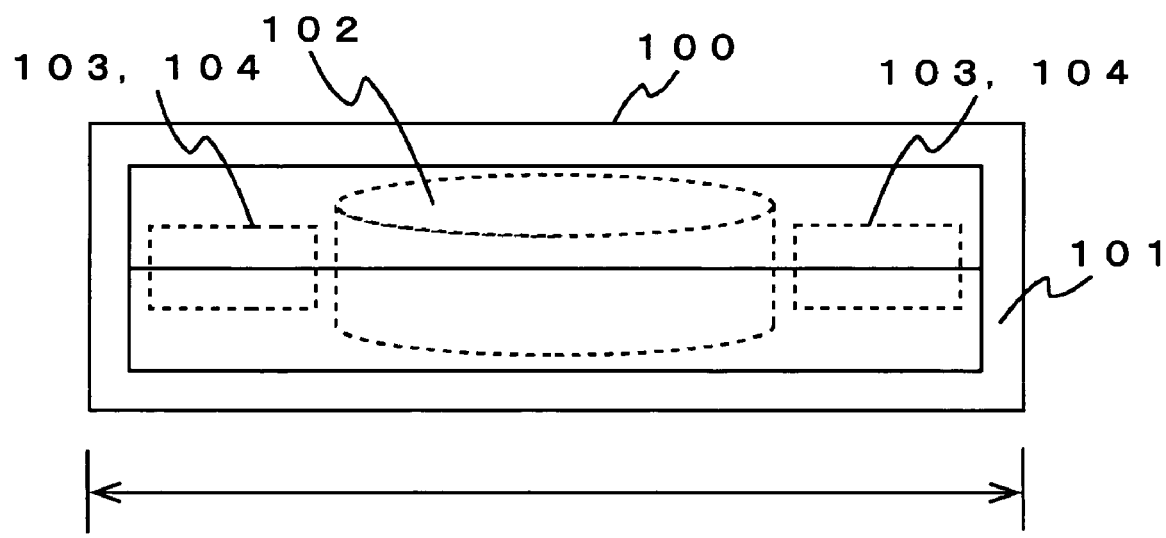
FIG. 7B illustrates the width of a conventional electromagnetic actuator.
Figure 10:
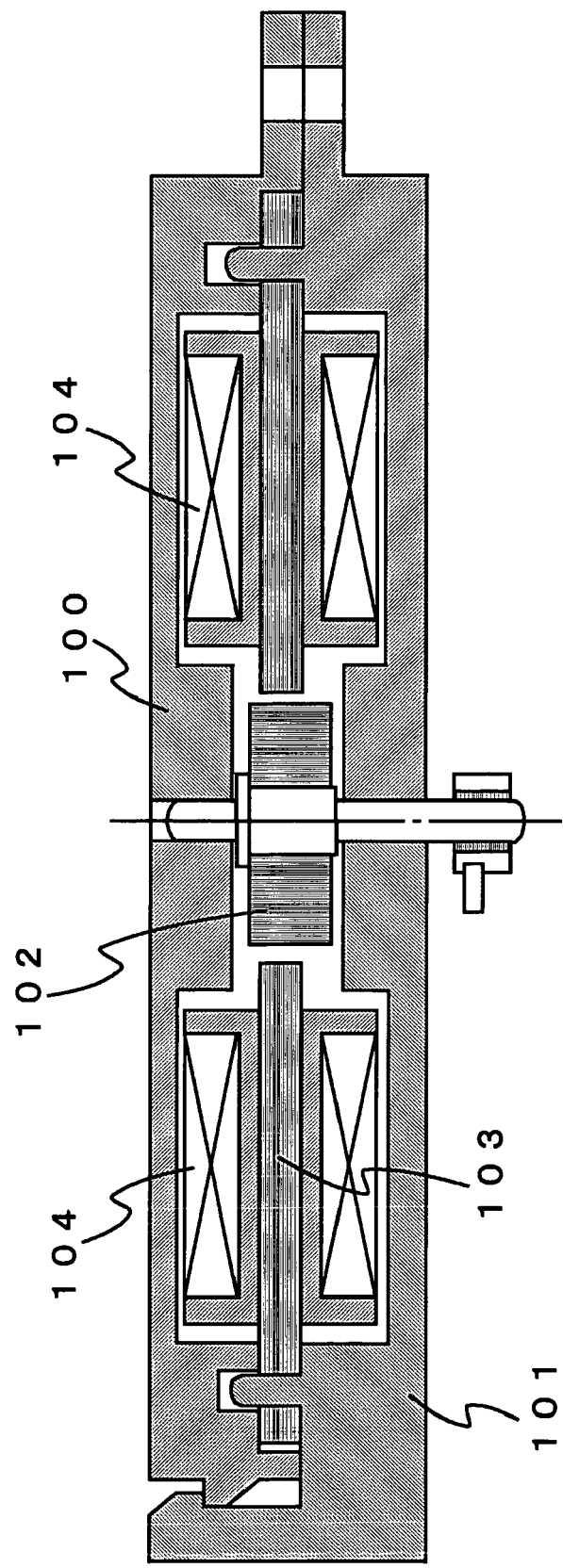
FIG. 10 illustrates the structure of a conventional electromagnetic actuator.

As described above, in this embodiment, the first arm portion 13 and the second arm portion 14 connecting the magnetic poles of the stator 3 extend to the outside of the rotor housing 7, as shown in FIG. 1, and the first coil 4 and the second coil 5 are wound around the extending portions. In this manner, the first coil 4 and the second coil 5 are exposed to the outside of the rotor housing 7. Accordingly, compared with a case where the rotor housing 7 also houses the first coil 4 and the second coil 5 as shown in FIG. 7B, the width of the electromagnetic actuator 1 can be made smaller by the thickness of the rotor housing 7. Thus, the electromagnetic actuator 1 can be made more compact. FIG. 7A is a cross-sectional view of the electromagnetic actuator 1, taken along the line B-B' of FIG. 1. FIG. 7B is a cross-sectional view of the conventional electromagnetic actuator of FIG. 10, taken along the same line as the line B-B'.

The stator holding space 16 is also formed in the rotor housing 7, so that the stator 3 is fixed to the rotor housing 7. As the stator 3 made of a metal is inserted to the rotor housing 7 made of a resin, the strength of the electromagnetic actuator 1 is increased.

Figure 8:
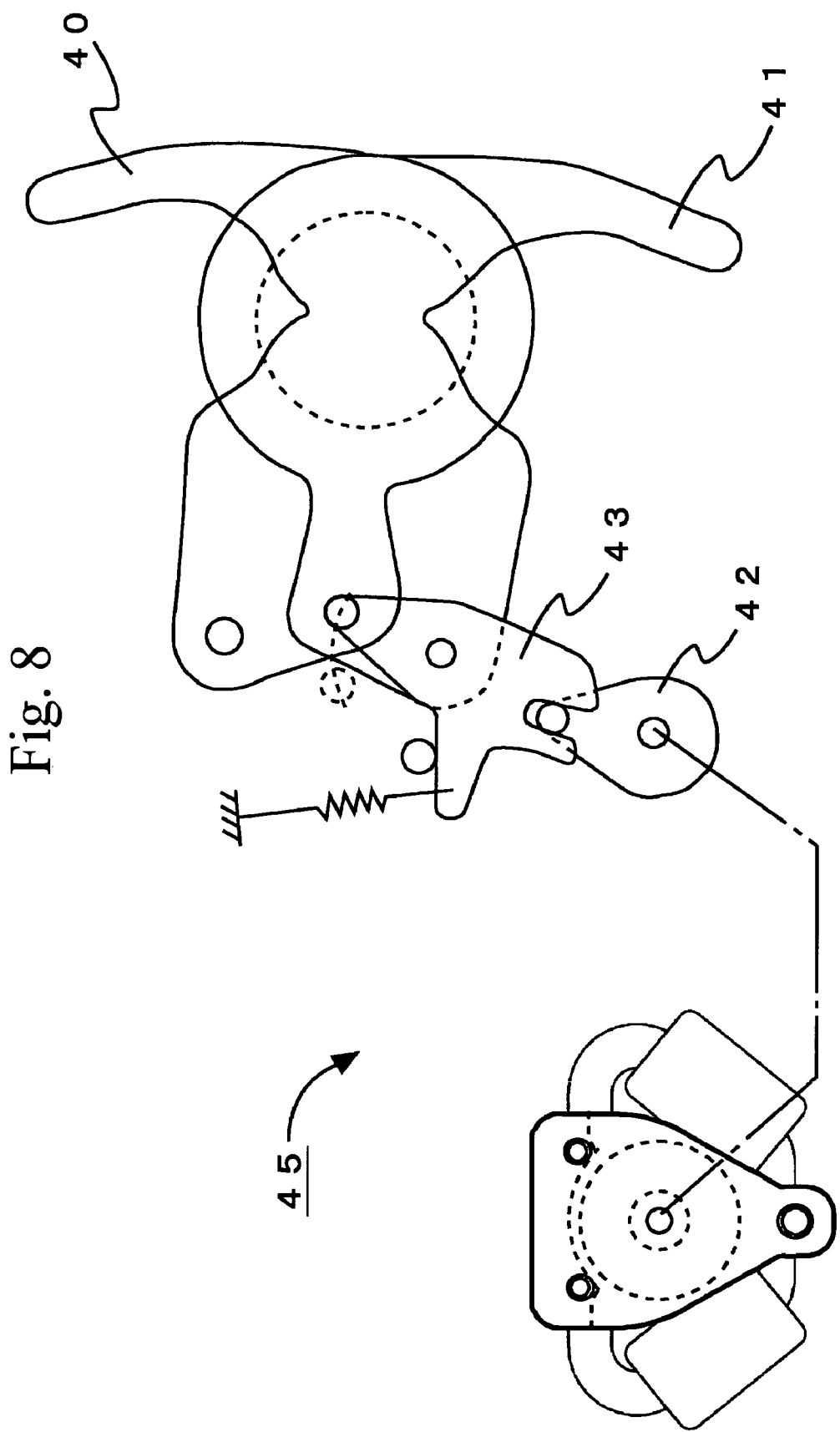
FIG. 8 shows a sector device as an example in which the electromagnetic actuator of this embodiment is implemented.
Figure 9:
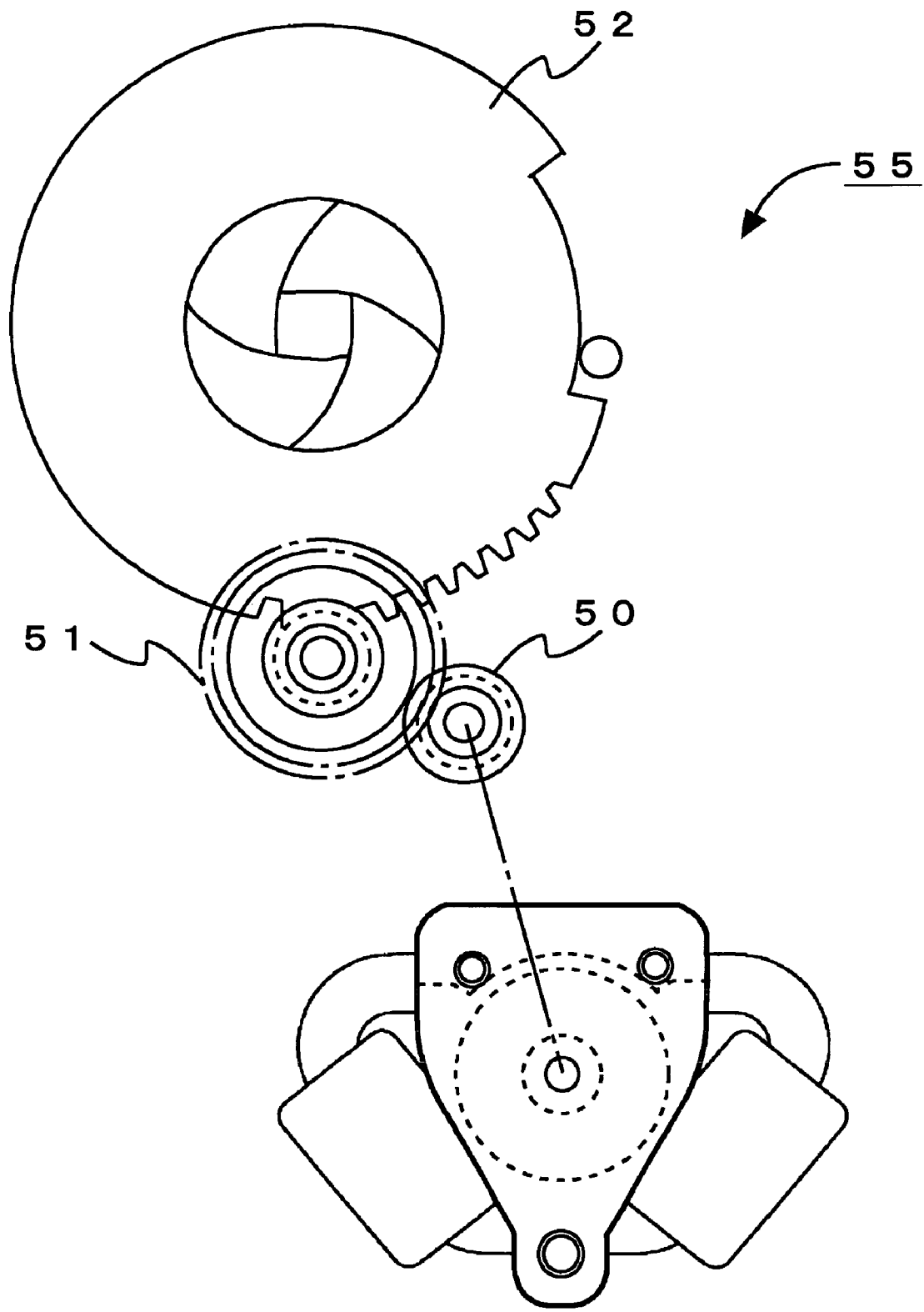
FIG. 9 shows an aperture device as an example in which the electromagnetic actuator of this embodiment is implemented.

FIGS. 8 and 9 illustrate examples in which the electromagnetic actuator 1 with the above described structure is implemented. The example shown in FIG. 8 is a sector device 45 that opens and closes sectors 40 and 41 with a sector open/close lever 43 connected to a rotor actuating lever 42 that is attached to the rotor axis 6 of the electromagnetic actuator 1. The example shown in FIG. 9 is an aperture device 55 that adjusts the aperture of an aperture driving member 52 by virtue of the driving force of the electromagnetic actuator 1, with gears or pinions 50 and 51 being attached to the rotor axis 6 of the electromagnetic actuator 1.

The above described embodiments are preferred embodiments of the present invention. However, the present invention is not limited to those embodiments, but various changes and modification may be made to them, without departing from the scope of the present invention.

The invention claimed is:

1. An electromagnetic actuator comprising:
a permanent-magnet rotor;
a stator that is magnetically bonded to the permanent-magnet rotor and substantially surrounds the permanent-magnet rotor;
at least two coils that excite the stator; and
a rotor housing that rotatably supports and houses the permanent-magnet rotor,
the rotor housing supporting the stator so that magnetic poles of the stator face an outer peripheral face of the permanent-magnet rotor, one of each of the at least two coils being wound around portions of the stator extending to the outside of the rotor housing;
wherein the rotor housing has at least two openings, wherein one of each of the at least two openings corresponds to one of each of the at least two coils so that the at least two coils are immediately proximate to the permanent-magnet rotor; and
further wherein the stator comprises a notch sized to engage a convex portion of the housing to position the stator relative to the rotor housing.

2. The electromagnetic actuator as claimed in claim 1, wherein:
the stator includes three magnetic poles, and two arm portions that connect the three magnetic poles and extend to the outside of the rotor housing; and
one of each of the at least two coils is wound around one of each of the two arm portions.

3. The electromagnetic actuator as claimed in claim 1, wherein:
the stator has a trapezoid shape that has separate portions at the center portion of the lower bottom portion thereof, when seen in a plan view;
two of the magnetic poles are formed at the facing ends of the separate portions at the lower bottom portion, while the other one of the magnetic poles is formed at the center portion of the upper bottom portion of the trapezoid; and
one of each of the at least two coils is wound around one of each of the two side portions of the trapezoid.

4. The electromagnetic actuator as claimed in claim 3, wherein:
the rotor housing has an isosceles triangle shape when seen in a plan view; and
the lower bottom portion of the trapezoid shape of the stator is located on the same side as the base portion of the isosceles triangle shape of the rotor housing.

5. The electromagnetic actuator as claimed in claim 1, wherein:
the rotor housing includes a first casing and a second casing that clamp and support the stator; and
positioning portions that are to be engaged with the magnetic poles of the stator so as to secure the magnetic poles to the permanent-magnet rotor are formed in at least one of the first casing and the second casing.

6. The electromagnetic actuator as claimed in claim 1, wherein:
the rotor housing includes a first casing and a second casing that clamp and support the stator; and
at least one of the first casing and the second casing is made of a thermoplastic resin that is to be heated to bond the first casing and the second casing to each other.

7. The electromagnetic actuator as claimed in claim 1, wherein the rotor housing has an engaging concave portion or an engaging convex portion formed for positioning the electromagnetic actuator to a member to which the electromagnetic actuator is to be mounted.

8. The electromagnetic actuator as claimed in claim 1, wherein:
the permanent-magnet rotor has a rotational axis protruding from the rotor housing; and
a driving member for transmitting torque of the rotational axis to another member is attached to the protruding portion of the rotational axis.

9. The electromagnetic actuator as claimed in claim 1, wherein the stator is coated with a thermoplastic resin.

10. The electromagnetic actuator as claimed in claim 1, wherein at least one of the first casing and the second casing is made of a laser transmission resin.

* * * * *